(12) United States Patent
Kokku et al.

(10) Patent No.: US 11,158,203 B2
(45) Date of Patent: Oct. 26, 2021

(54) PHASED WORD EXPANSION FOR VOCABULARY LEARNING

(71) Applicants: International Business Machines Corporation, Armonk, NY (US); Sesame Workshop, New York, NY (US)

(72) Inventors: Ravi Kokku, Yorktown Heights, NY (US); Tamer E. Abuelsaad, Armonk, NY (US); Prasenjit Dey, Bangalore (IN); Satyanarayana V. Nitta, Cross River, NY (US); Miles Ludwig, New York, NY (US); Emily Reardon, New York, NY (US); James Gray, Cambridge, MA (US)

(73) Assignees: International Business Machines Corporation, Armonk, NY (US); Sesame Workshop, New York, NY (US)

( * ) Notice: Subject to any disclaimer, the term of this patent is extended or adjusted under 35 U.S.C. 154(b) by 380 days.

(21) Appl. No.: 15/896,808

(22) Filed: Feb. 14, 2018

(65) Prior Publication Data
US 2019/0251855 A1    Aug. 15, 2019

(51) Int. Cl.
*G09B 7/04* (2006.01)
*G06N 5/02* (2006.01)
(Continued)

(52) U.S. Cl.
CPC .............. *G09B 7/04* (2013.01); *G06N 5/022* (2013.01); *G09B 5/12* (2013.01); *G09B 7/02* (2013.01); *G09B 19/04* (2013.01)

(58) Field of Classification Search
CPC .......... G09B 19/06; G09B 19/04; G09B 7/04; G09B 17/00; G09B 5/12; G09B 7/02; G10L 15/063; G06N 5/022
(Continued)

(56) References Cited

U.S. PATENT DOCUMENTS

| 5,779,486 | A  * | 7/1998  | Ho ........................... G09B 5/14 434/353 |
| 6,260,033 | B1 * | 7/2001  | Tatsuoka ........ G01R 31/318371 434/322 |
| 6,305,942 | B1 * | 10/2001 | Block .................... G09B 5/065 434/156 |

(Continued)

*Primary Examiner* — Jack Yip
(74) *Attorney, Agent, or Firm* — Scully, Scott, Murphy & Presser, P.C.; Daniel P. Morris

(57) ABSTRACT

A combination of knowledge representation and retrieval, assessments and personalization for a tutoring platform that provides an automated phased word exposition method for vocabulary learning and enable learners to learn words (or any learning objective) with sufficient proficiency and without excessive repetition. The phased learning objective method implements a moving average model that models the learner across multiple dimensions (e.g. reading, listening, writing, speaking) such that the platform is confident of the learner's understanding, while using minimal assessment doses, and such that the understanding transfers across experiences. The method implemented provides for multiple learning and assessment activities for a learning objective and leverages the same learner model for each learning dimension. Each word of a word set passes through learning and assessment-only phases for statistically significant evidence of learning. The model derived from the phased word expansion can be shared across applications, toys and tangibles that learners interact with.

19 Claims, 8 Drawing Sheets

(51) Int. Cl.
*G09B 19/04* (2006.01)
*G09B 5/12* (2006.01)
*G09B 7/02* (2006.01)

(58) Field of Classification Search
USPC ........................................................ 434/169
See application file for complete search history.

(56) References Cited

U.S. PATENT DOCUMENTS

| | | | | |
|---|---|---|---|---|
| 6,676,412 B1* | 1/2004 | Masterson | ............... | G09B 7/02 |
| | | | | 434/169 |
| 6,755,657 B1* | 6/2004 | Wasowicz | ................ | G09B 5/04 |
| | | | | 434/167 |
| 2003/0129574 A1* | 7/2003 | Ferriol | ...................... | G09B 5/00 |
| | | | | 434/362 |
| 2004/0029084 A1* | 2/2004 | Johnson | ................... | G09B 5/04 |
| | | | | 434/169 |
| 2010/0273138 A1 | 10/2010 | Edmonds et al. | | |
| 2014/0134576 A1 | 5/2014 | Edge et al. | | |
| 2014/0134588 A1* | 5/2014 | Capone | ............... | H04L 67/2852 |
| | | | | 434/322 |
| 2014/0170612 A1 | 6/2014 | Yudavin | | |
| 2014/0295384 A1* | 10/2014 | Nielson | ................. | G06F 40/263 |
| | | | | 434/157 |
| 2016/0293036 A1* | 10/2016 | Niemi | ...................... | G09B 7/04 |
| 2017/0116870 A1* | 4/2017 | Brem | ...................... | G09B 7/04 |
| 2017/0178531 A1* | 6/2017 | Swank | ...................... | G09B 7/08 |
| 2018/0293905 A1* | 10/2018 | Benz | ......................... | G09B 5/00 |
| 2018/0293912 A1* | 10/2018 | Ni | ........................... | G09B 5/065 |

\* cited by examiner

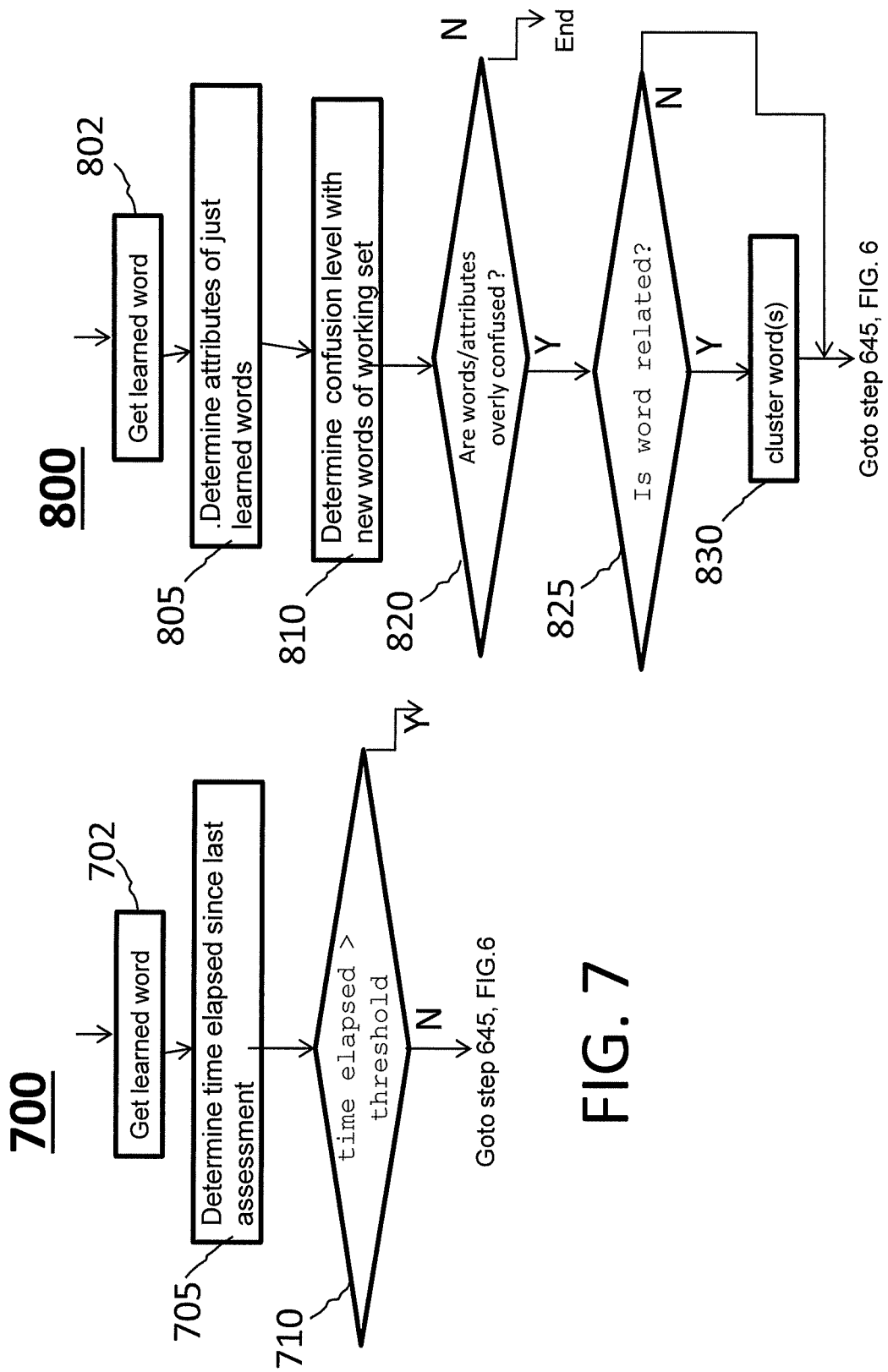

PHASED WORD EXPANSION FOR VOCABULARY LEARNING

FIELD

The present invention generally relates to computer systems, platforms or engines for analyzing speech, and more particularly, to a computer-implemented system and method for improving a user's vocabulary.

BACKGROUND

Vocabulary building is one of the key curricula in early childhood learning (ECL).

Vocabulary learning activities have to be personalized and adapted as a child learns to ensure that the words in the learning-context are exposed just enough that the child learns the words without getting bored of unnecessary repetition.

Learning context includes repetition of words, showing videos of words in a broader context such as stories and rhymes, conversations to elicit explicit discussion of the word, etc.

A key aspect of tuning the learning activities to the right "dose" is to do continuous assessments and stop learning activities at the appropriate time.

Vocabulary assessment is not a trivial task using automated tutoring systems since it is not easy to know when the child has learned a word, or when the child is still learning. Further, the proficiency of a word is not binary in nature (e.g. knows vs. does not know), but instead is a continuous function and different levels of proficiency for both receptive and expressive purposes is achieved as the child uses the word.

The proficiency of a word can also be different for reading, listening, speaking and writing objectives.

Assessing a child when they have not completed learning can be demotivating, and conversely, giving learning content to a child again and again after completion of learning can be monotonous to the child and hence make them lose interest.

SUMMARY

In one embodiment, there is provided a system, method and computer program product that defines phases for vocabulary learning to make vocabulary learning more structured.

In one embodiment, there is provided a computer-implemented method for phased learning. The method comprises: administering to a user one or more learning and assessment activities associated with one or more learning objectives; assessing a user's proficiency of each the learning objective based on the learning activities and generating an associated assessment proficiency score; and for each learning objective: determining, by running a learner model update procedure on a processor of a computing device, a learner score associated with the learning objective based on the generated assessment score corresponding to each of the one or more learning activities associated with the learning objective; comparing, using the hardware processor, the learner score against one or more threshold values; and repeating the administering, the assessing, the determining and the comparing until the user's learner score for said learning objective exceeds a threshold value demonstrating said user having sufficient proficiency for the learning objective.

In a further embodiment, there is provided a computer-implemented system for phased learning. The system comprises: a memory storage system storing program instructions; and a processor for running the stored program instructions to configure the processor of a computing device to: administer to a user one or more learning and assessment activities associated with one or more learning objectives; assess a user's proficiency of each the learning objective based on the learning activities and generating an associated assessment proficiency score; and for each learning objective: determine, by running a learner model update procedure on the processor, a learner score associated with the learning objective based on the generated assessment score corresponding to each of the one or more learning activities associated with the learning objective; compare the learner score against one or more threshold values; and repeat the administering, the assessing, the determining and the comparing until the user's learner score for the learning objective exceeds a threshold value demonstrating the user having sufficient proficiency for the learning objective.

Other embodiments include a computer program product for phased word expansion for phased learning. The computer program product includes a storage medium readable by a processing circuit and storing instructions run by the processing circuit for running a method. The method is the same as listed above.

BRIEF DESCRIPTION OF THE DRAWINGS

Objects, features, and advantages of the present disclosure will become more clearly apparent when the following description is taken in conjunction with the accompanying drawings, in which:

FIG. 7 depicts a method to address the phenomena of a learner's memory decay for the phased word expansion method for vocabulary learning according to one embodiment;

FIG. 8 depicts a method to address the phenomena of a learner's interference decay for the phased word expansion method for vocabulary learning according to one embodiment;

DETAILED DESCRIPTION

The present disclosure describes a computer-implemented method and system for phased learning. In a non-limiting embodiment, the principles for phased learning described herein are illustrated in the context of learning vocabulary words—a learning objective—across multiple learning dimensions, e.g., reading, listening, writing, speaking. In this context, the phased learning system addresses the challenge of modeling the learner, e.g., a child from Kindergarten age or greater, across multiple dimensions (e.g. reading, listening, writing, speaking) such that the system is confident of the child's understanding, while using minimal assessment doses, and such that the understanding transfers across experiences. In one aspect, the learning system provides a methodology that enables an effective way of defining phases for vocabulary learning to make vocabulary learning more structured. The personalized learning solution implements mechanisms to understand the student through assessments, and adapt learning. Personalized vocabulary learning ensures that the words in the learning-context are exposed just enough that the child learns the words, without getting overwhelmed by unnecessary repetition. At the heart of the system is a unified learner model that helps ensure that content and assessments are exposed to each individual child in a systematic manner for maximal efficacy of vocabulary acquisition and retention.

Further, the system and method enables multiple learning and assessment activities to leverage the same learner model of a child. The methods thus provide a tuning of the learning activities to the right "dose" by continuous assessments, such that the learning activities may be stopped at the appropriate time.

Figure 1:
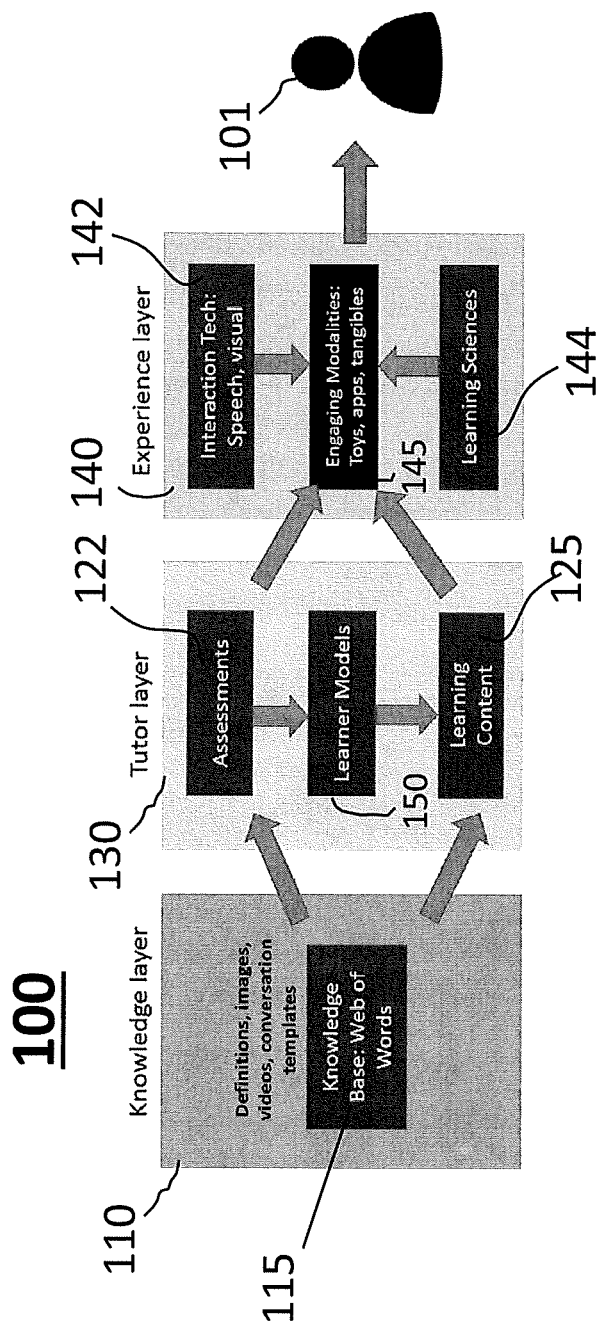
FIG. 1 shows a layered tutor architecture that enables easily extensible adaptive vocabulary instruction using a systematic combination of technologies.

In one aspect of the disclosure, as shown in FIG. 1, there is provided a layered tutor architecture 100 that enables easily extensible adaptive vocabulary instruction using a systematic combination of technologies designed as three layers: a knowledge layer 110, a tutor layer 130 and an experience layer 150. In one embodiment, the knowledge layer 110 is a knowledge base that is represented as a web of words and concepts: each node in the word web represents a word or a concept, and each link between a pair of nodes represents one or more relationships between them. A number of word and common sense databases (e.g. WordNet ( ) ConceptNet ( ), OpenCyc( )), along with hand-curated information by subject matter experts form the basis of this knowledge layer 110. This layer represents content in easily query-able knowledge base 115. Knowledge layer 110 further indexes into learning content 122 and assessment content 125 of tutor layer 130. It should be understood that the phased learning architecture and learner model provided herein is applicable to other domains besides vocabulary word building.

At the heart of the tutor layer 130 is a unified learner model 150 that helps ensure that content and assessments are exposed to each individual child in a systematic manner for maximal efficacy of vocabulary acquisition and retention. Such learning and assessment content include related images and videos, which can be easily extended to other forms of content such as stories and rhymes. For instance, in the context of vocabulary learning, a word such as "camouflage" will have definition of the word, images showing the word camouflage in different settings, videos explaining the concept, and usage of the word in different sentences that are used for conversations.

In one embodiment, the knowledge base 115 is represented as a graph data structure including nodes and links that helps derive assessments automatically (which can be filtered later by a subject matter expert) using inter-word relationships through automatic graph traversal techniques. One example approach leverages the observation that creating new and customized assessments by a human is in general harder than verifying the auto-created ones. Exposing these assessments repeatedly over a period of time in a variety of gamified contexts help establish more confidently the child's understanding of a word or a concept.

In the process of exposing different assessments to a learner 101 (e.g., a child), the tutoring platform 120 builds learner models 150 that are transferable across multiple activities. For instance, the fact that a child has learnt a word "arachnid" in one mobile application can be used by another application or a toy to expose "arachnid" in the context of a game or a conversation or an activity.

System 100 provides learning content and assessments phases to the child learner through an experience layer 140 that, in conjunction with a tutor or educator, administers learning content and assessments via engaging modalities 145 such as toys, applications and tangibles. A tutor or educator may leverage interaction technology 142 and learning sciences techniques 144 to maximally engage the child 101 with learning material and assessment while not being unduly burdensome or repetitious.

Figure 2:
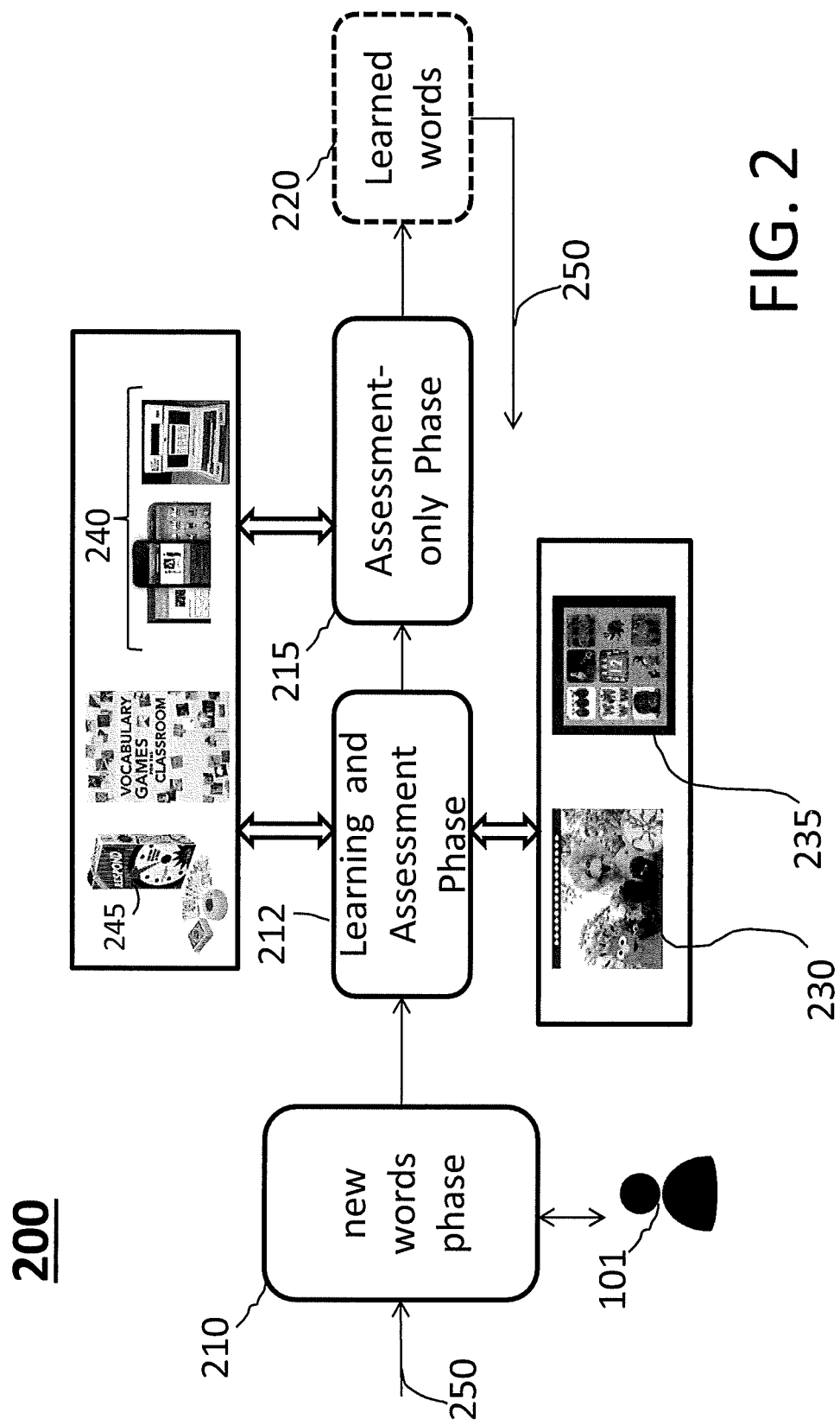
FIG. 2 conceptually depicts a phased-word exposition model that drives the vocabulary tutor according to one embodiment.

FIG. 2 conceptually depicts a phased-word exposition model 200 that drives the vocabulary tutor. Model 200 provides for the systematic exposition of words, and enables repetition on a controlled set of words to be learned at any point of time. The method 200 provides the layered tutor architecture that enables easily extensible adaptive vocabulary instruction. Method 200 extensibility ensures that vocabulary instruction can continue to happen across multiple years through a variety of learning experiences including mobile applications, videos, toys, activities involving tangible interfaces, etc.

In FIG. 2, the learning method is initiated at 210 by providing to a reader or learner 101 (e.g., a child of Kindergarten age or greater), reading material having one or more "new" words to enhance the reader's vocabulary. The words make up a "controlled set" or "working set" chosen at a time and which may be expanded based on known and/or related words. In one embodiment, the working set of words may be a small number, e.g., 10-20 words.

In one embodiment, the working set of new words to be introduced to the reader are related to enhance the user's understanding. As a non-limiting example, a working set of "new" words may be the related words such as "ecosystem", "environment", "habitat", "rainforest", "marshlands", "desert", "forest", "garden", "ocean", "tree", "plant", "animal" and "seed".

Via a learning platform, and/or as administered by the child's tutor or educator in a classroom, the next phase includes a learning and assessment phase 212 where the new vocabulary words to be learned are "reinforced", via a media such as by audio/visual reinforcement (videos), and other mechanisms such as by rhymes, jokes, dialog, etc. In one embodiment, during the learning and assessment phase 212 the system leverages activities that may be performed by the child, e.g., using in-classroom computer media applications ("Apps") 230 or direct consumer apps 235.

In one embodiment, the learning and assessment phase 212 may includes the explicit repetition of words, the presenting and showing of videos using the words in a broader context such as stories and rhymes, and conversations to elicit explicit discussion of the word, etc.

Once the reader has achieved a sufficient "learning" of the new vocabulary word(s), as measured by a confidence score or level, the reader may be further evaluated in an assessment-only phase 215 where the reader's multi-dimensional proficiency (e.g. receptive vs. productive) is evaluated to ensure the reader absolutely knows the word and concept. To evaluate proficiency, such dimensions for a word may include rhyming words, antonyms or synonyms of the learned word. In one embodiment, the reader's vocabulary proficiency may be assessed in the learning and assessment phase and assessment-only phase 215 via application of elements of game playing, i.e., gamification. For example, via application of "smart" toys 240 providing digital interactive interfaces, or classroom games 245 administered by a teacher in the classroom or by a tutor, the reader's multi-dimensional proficiency (e.g. receptive vs. productive) is evaluated. In a further embodiment, to effect an assessment, there may be implemented I-o-T (Internet-of-Things) extensions for physical-digital learning. Through gamification, the reader's receptive skills (e.g., listening and reading skills) and productive skills (e.g., speaking and writing) are evaluated. Based on the evaluation, a corresponding learning (confidence) score and assessment score are generated for updating the learner model for that child.

Finally, the child enters the "learned" phase 220 after the child has shown/exhibited consistent proficiency of the new word(s) above a threshold. Upon entry into learned phase 220, at 250, the system is triggered to return to the new words phase where a new set of vocabulary words to introduce into the working set for phased learning are selected. It should be understood that, in exemplary embodiments, the system may be working on more than one word at a time per learner, i.e., it may be working on many concurrent words per learner. Each of the words per working set can be in the same or different phases (however, one word can be in only one phase at a time).

Figure 3:
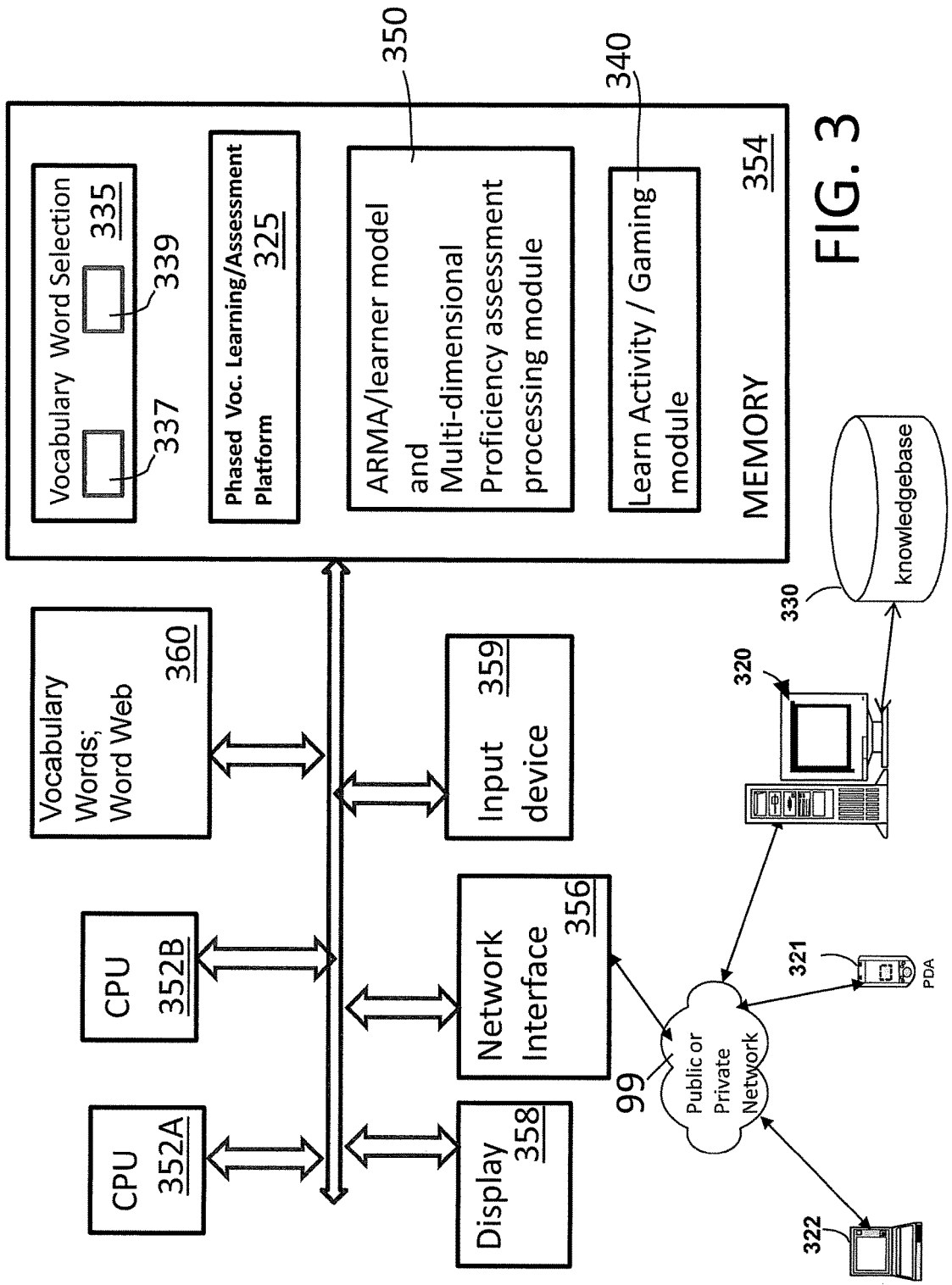
FIG. 3 shows a computing system configured enabling a specific effective way of defining phases for vocabulary learning in one embodiment.

FIG. 3 shows a computing system 300 configured enabling a specific effective way of defining phases for vocabulary learning to make vocabulary learning more structured for a reader (e.g., a child) as shown in the model of FIG. 2.

In some aspects, system 300 may include a computing device, a mobile device, or a server. In some aspects, computing device 300 may provide for a user an intelligent play and learning platform and is embodied, for example, as a personal computer, laptop, tablet, smart device, smart phone, or any other similar computing device.

Computing system 300 includes one or more processors 352A, 352B, a memory 354, e.g., for storing an operating system and program instructions, a network interface 356, a display device 358, an input device 359, and any other features common to a computing device. In some aspects, computing system 300 may, for example, be any computing device that is configurable to communicate with a web-site embodied as a web-based or cloud-based server 320, e.g., IBM's Watson®, or with other computing devices, e.g., user devices 320, 321, over a public or private communications network 99. For example, the Watson® services may employ text-to-speech, speech-to-text and visual recognition capabilities customized to suit early childhood use cases.

Further, as shown as part of system 300, data such as new vocabulary words, e.g., portions of a Word Web, may be stored locally in an attached memory storage device 360, or otherwise may be stored in a remote memory storage device, e.g., a knowledge database (knowledgebase), and accessed via a remote network connection for input to the system 300.

In the embodiment depicted in FIG. 3, processor 352A, 352B may include, for example, a microcontroller, Field Programmable Gate Array (FPGA), or any other processor that is configured to perform various operations. Processors 352A, 352B may be configured to execute instructions as described herein below. These instructions may be stored, for example, as programmed modules in memory storage device 354.

Memory 354 may include, for example, non-transitory computer readable media in the form of volatile memory, such as random access memory (RAM) and/or cache memory or others. Memory 354 may include, for example, other removable/non-removable, volatile/non-volatile storage media. By way of non-limiting examples only, memory 354 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 356 is configured to transmit and receive data or information to and from a server 320, e.g., running Watson®, or a learner's personal device 321, 322, via wired and/or wireless connections. For example, network interface 356 may utilize wireless technologies and communication protocols such as Bluetooth®, WWI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 300 to transmit information to or receive information from the devices 320, 321, 322.

Display 358 may include, for example, a computer monitor, television, smart television, a display screen integrated into a personal computing device such as, for example, laptops, smart phones, smart watches, virtual reality headsets, smart wearable devices, or any other mechanism for administering vocabulary building techniques to a user. In some aspects, display 358 may include a liquid crystal display (LCD), an e-paper/e-ink display, an organic LED (OLED) display, or other similar display technologies. In some aspects, display 358 may be touch-sensitive and may also function as an input device.

Input device 359 may include, for example, a keyboard, a mouse, a touch-sensitive display, a keypad, a microphone, or other similar input devices or any other input devices that may be used alone or together to provide a user with the capability to interact with the learning platform module at the computing device 300.

In one embodiment, programmed processing modules stored in a device memory 354 provide the system 300 with a phased-word exposition method that enables systematic exposition of words, and enables repetition on a controlled set of words at any point of time.

Figure 6:
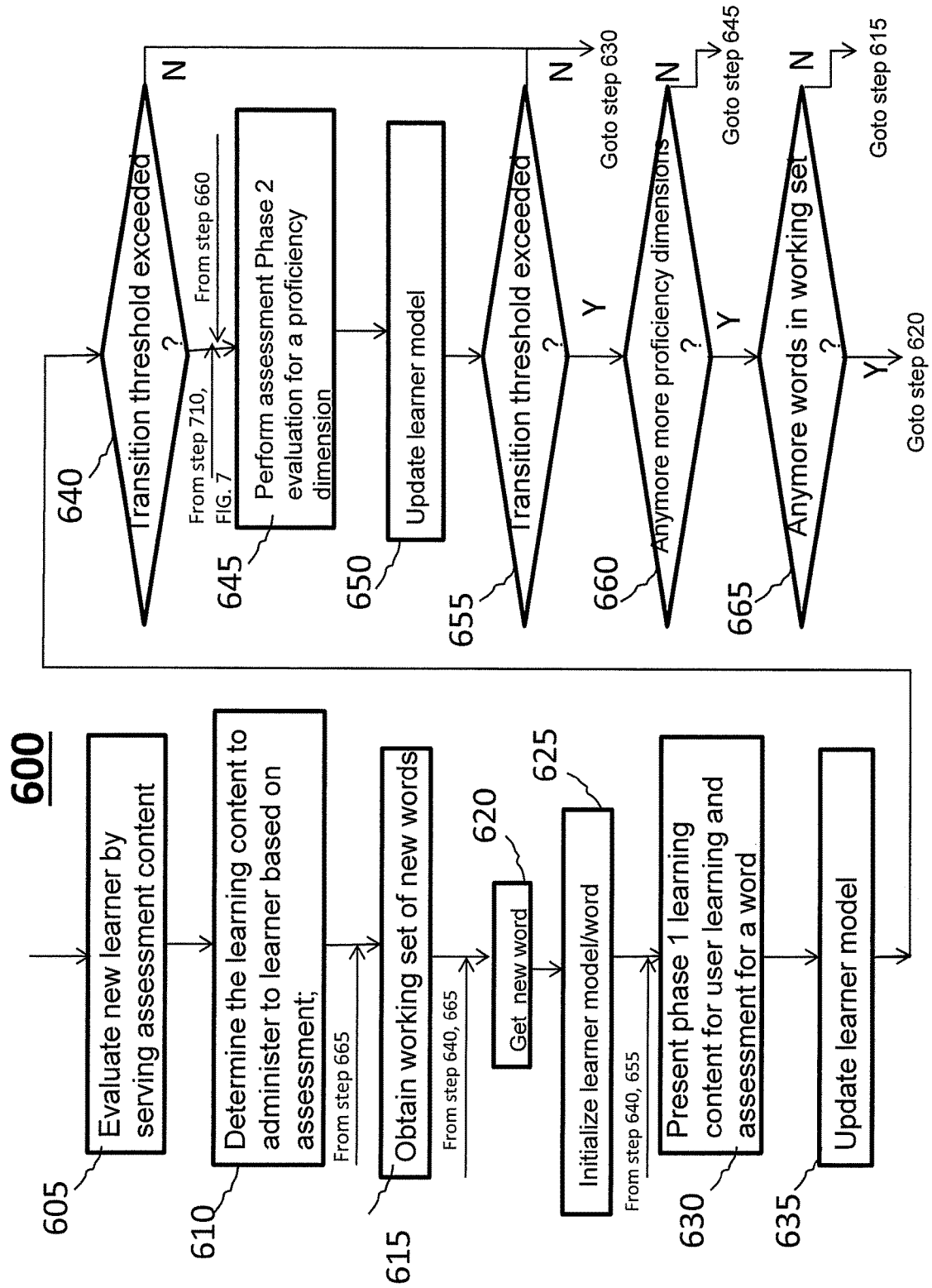
FIG. 6 depicts a phased word expansion method for vocabulary learning according to one embodiment.

As shown in FIG. 3, one program module stored in a device memory 354 may include a phased learning/assessment platform module 325 for use in governing the overall phased word exposition method for vocabulary learning according to the methods described herein with respect to FIGS. 6 and 7. In one aspect, platform module 325 generates for a computing system device display, a learning platform for a learner interaction including the generating of learning content for a display, e.g., at a learner's computing device, and provision of an interface enabling structured user interaction with the phased vocabulary word learning tool according to the methods described herein. Such a phased learning platform invokes operations for selecting new sets of vocabulary words, selecting particular learning tool/techniques and invoking a learner/gaming module 340 for administering selected learning tools, videos, audio/video materials, texts, tutorials, and computer or mobile device applications, e.g., for administering learning methods and evaluating learner's proficiency.

For example, when in the assessment-only phase, platform module 325 may further invoke learner/gaming module 340 to administer gamification techniques, such as may be provided in digital gaming applications that may be used for evaluating the receptive and productive proficiency of the learner. Such gamification techniques provide ways for evaluating learner's proficiency of the new word across multiple-dimensions, i.e., learning objectives such as reading, writing, listening and speaking. In another embodiment, the dimensions for each word may be the number of related words in different categories such as: rhyming words, antonyms, synonyms that may specify how well the learner (e.g., child) understands the main concept the word represents. The learning/gaming module 340 are adapted to generate corresponding assessment scores which may be used by the learner model to generate an overall learner score which value demarcates a user's entry to/exit from a particular learning phase when compared against respective phase transition thresholds.

The phased learning platform module 325 may further invoke techniques for preventing or minimizing learner memory decay. In a non-limiting example, the platform module may keep track of time elapsed after the learner has learned the new vocabulary words, and re-introduce or transition those same learned words back into the assessment phase to reinforce and ensure the learner's mastery over that word.

One device module stored in a device memory 354 and called by the platform module 325 includes a module 335 for use in selecting the vocabulary words to be learned by the user and an order for their introduction into a working set of words. For example, to easily introduce a learner to new words, there may be invoked functions to bootstrap the selection of next words with words already mastered by that learner. For example if a child knows about "careers," good next words may be specific careers, such as athlete, dentist, etc. Or if the learner knows about a musical instrument, there may be chosen another musical instrument in the next word learning phase.

In one embodiment, such vocabulary word selecting functions may implement a selection algorithm that invokes a Zone of Proximal Development (ZPD) between new words and mastered words. Two techniques to identify the proximity between one (or more) words and another may be invoked, however, it is understood that there could exist other techniques that could be implemented for phased working set word selection. One technique implements word embedding functions 337 that aims at quantifying and categorizing contextual similarities between linguistic items based on their distributional properties in large samples of language data. Another technique is implementing a "Word Web" 339 where words (nodes/vertices) are connected to one another via edges. The edges represent a relationship between the words. The number of hops from one word to another represents the strength of the conceptual or syntactic similarity or relatedness between two given words.

As a simple example, given that a child has learned words "Tree", "Plant", "Seed" and "Animal", and a current working set of words in learning phase include "desert", "forest", "garden", "ocean", the word web or word embedding techniques implemented for vocabulary expansion may select related words "habitat", "rainforest", "marshlands" as a new working set. Thus, if the learner knows the word "Tree" with exceptional proficiency, then using the Word Embedding technique 337, the next assessment words may be served in this order: Forest, Garden, Ocean, desert and the next new set of learning words would be served in this order: Rainforest, Marshlands, Habitat.

One device module further stored in a device memory 354 and called by the platform module 325 includes a learner module such as an update model for time series data. One exemplary update model implemented is an auto-regressive moving average (ARMA) learner model and multi-dimensional proficiency assessment processing module 350. The ARMA /learner model and multi-dimensional proficiency assessment processing module receives learning assessment scores corresponding to each of the correct and incorrect attempts at various activities or applied applications that test receptive as well as productive knowledge of the words during the learning phase and assessment-only phases. In one embodiment, using current learner scores, an Exponentially Weighted Moving Average (EWMA) algorithm may be applied to new performance data to calculate the new learner score. Further, in one embodiment, the ARMA learner model thresholds are set as a function of proficiencies expected based on consecutive number of correct assessments.

In one embodiment, the learner model derived from the phased word expansion can be shared across applications, toys and tangibles that children interact with. In one embodiment, each application may be categorized as learning-focused, assessment-focused or both. Further, each application also has an associated goal of what it is trying to be improved, e.g., reading, speaking, writing, listening. The applications to be run during phased learning can request the word categories from the phased word expansion model. How the learning or assessment is exactly conducted is part of an application's logic. For example, at the end of each learner activity in the learning/assessment phase, the application process for updating the learner score in the learner model will send a data tuple, e.g., <attempt score (AS), category, goal>, to the learner (update) model and the model updates the learning score (LS). Any application can use the LS for its activity and also update the LS after the activity is performed such that a whole ecosystem of applications can leverage each other's learner model. Based on a consistency of scores from different applications, the LS computation may be weighed-up for the applications that seem to really result in good outcomes in other applications too, or weighed-down for the applications that seem to give inconsistent result in other applications (outliers).

Thus it is understood that there is one learner model that can be used by more than one application for the same user. That is, one learner model is implemented, but multiple consumer applications are sending it learner progress and asking for recommendations on which learning objectives to teach or assess next. For example, there are administered four different games that a person is using and they are all tied to the same curriculum of learning objectives. If the person takes an assessment in Game 1 and fails it, then goes to Game 2 (e.g., the next day), the learner model that Game 2 is using is the same one that Game 1 just updated. Thus, for example, if one game sees that the user did poorly on an assessment of the word "Arachnid," all other games will be influenced by that.

Figure 4:
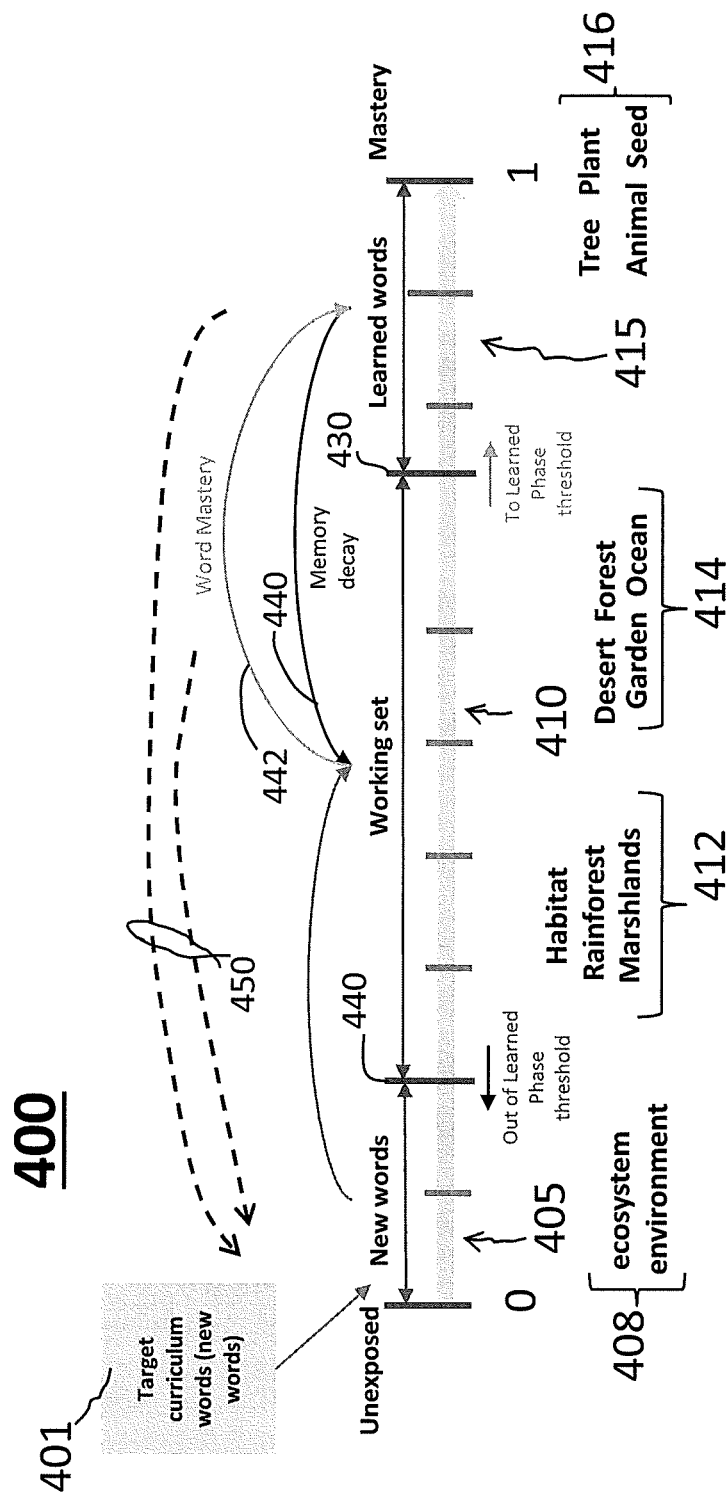
FIG. 4 depicts an example timeline of the phased learner model according to one embodiment.

FIG. 4 depicts a timeline 400 of the phased learner model. Initially, at 405, a working (controlled) set of target curriculum words, i.e., new words 401, are exposed to the learner. The learner who is unfamiliar with the working set may be new to the system, and consequently may have an ARMA learning model initialized. Over time, the learner model is built and a learner score updated as the learner develops an understanding and proficiency of sets of the new words by performing selected learning activities and assessment tools until a consistent proficiency is demonstrated. The learner model's score for that user evolves over time, e.g., increases, as the user's confidence level in understanding the word evolves and the user's degree of understanding changes.

In one embodiment, the selecting and administering of a combination of assessments and learning activities is driven by the understanding of the learner model. For example, a small number of new words, i.e., a "working set" of 10-20 words, may be first selected at 405.

During the working set phase 410 learning and validation (assessment) activity takes place where the working set words are constantly exposed to the learner in several different contexts. During this phase 410, the system continuously evaluates the learner's understanding of the words and the system generates a system confidence score indicating the how much the model believes the learner understands and can use the words in different contexts. The system works at building its confidence in one direction or the other about the learner's knowledge of a learning objective. In one embodiment, this score is a value ranging between 0 and 1 with 0 representing no knowledge and 1 representing the learner's mastery of the learning objective. During the working set phase 410, once the confidence score is determined above a learned phase threshold value, the learner is considered to have "learned" and demonstrated proficient use of the word(s) and at 442 is promoted to a "learned" phase 415.

For the example working set of related words, it may be the case that the learner may have exhibited mastery and multi-dimensional proficiency of words 416 such as "tree", "plant", "animal" and "seed" and with this knowledge, benefit from learning activities to increase vocabulary and proficiency in using related new word concepts 412 such as "habitat", "rainforest", "marshlands". Moreover, the learner may be further administered assessment-only activities to ensure the learner's proficiency with related concepts 414 such as "desert" and "forest" (based on learned word "tree"), "garden" (based on learned words "plants" and "seed") and "ocean". The learner in the example will subsequently learn meaning and enhance proficient use of the remaining new related word concepts 412 such as "habitat", "rainforest", "marshlands" and concepts 408 such as "ecosystem" and "environment".

Generally, the new words 401 introduced into the system in a working set are based on words or concepts that the learner already knows and exhibited proficiency in (e.g., simpler words 416). Thus, as further depicted by arrows 450, new words 401 to the curricula are introduced based on words in the learned and assessment phase (and learned word phase), and may be incrementally added as the working set of words decreases with learner's learning. Alternately, or in addition, the working set of words may be replenished when the number drops below a certain threshold of words in the working set. In one embodiment, new or next words to introduce to a learner may leverage words already mastered or learned by that learner.

FIG. 4 further depicts the phenomena of a learner's memory decay as depicted by arrow 440 transiting from the learned words phase 415 back to the working set phase 410. To prevent the possibility that the learner forgets or loses the proficiency or use of a word in any dimension, the system returns the learner to the assessment phase 410 in order to reinforce the words already learned.

In an exemplary embodiment, each vocabulary word passes through each of the phases for statistically significant evidence of learning. Thus, in the working set phase 410, the learner is continuously assessed to ascertain the degree of proficiency and a learner score is generated and updated based on the assessments. The learner's phase transitions happen at particular thresholds of the learner's score. For example, there may be a learned phase threshold 430 that when exceeded, indicates the learner has mastery of the word and transits to the learned word phase 415. At such time, the system has enough confidence, and is ensured that the learner has been exposed to enough number of learning activities to reasonably assure that the child knows the word. Thus, the learner does not have to be exposed to any further learning activity for that word. However, in one embodiment, the learner may be subject to more assessments to build more confidence. If upon a subsequent assessment it is determined that a learner's assessment score falls below an "out-of-learned" phase threshold 440, then this indicates the learner may benefit from remedial teachings of the word. That is, after learning the word, the learner may transition out of the learned phase 415 if the user's proficiency subsequently decreases and assessment scores reveal the need to re-learn the word.

Figure 5:
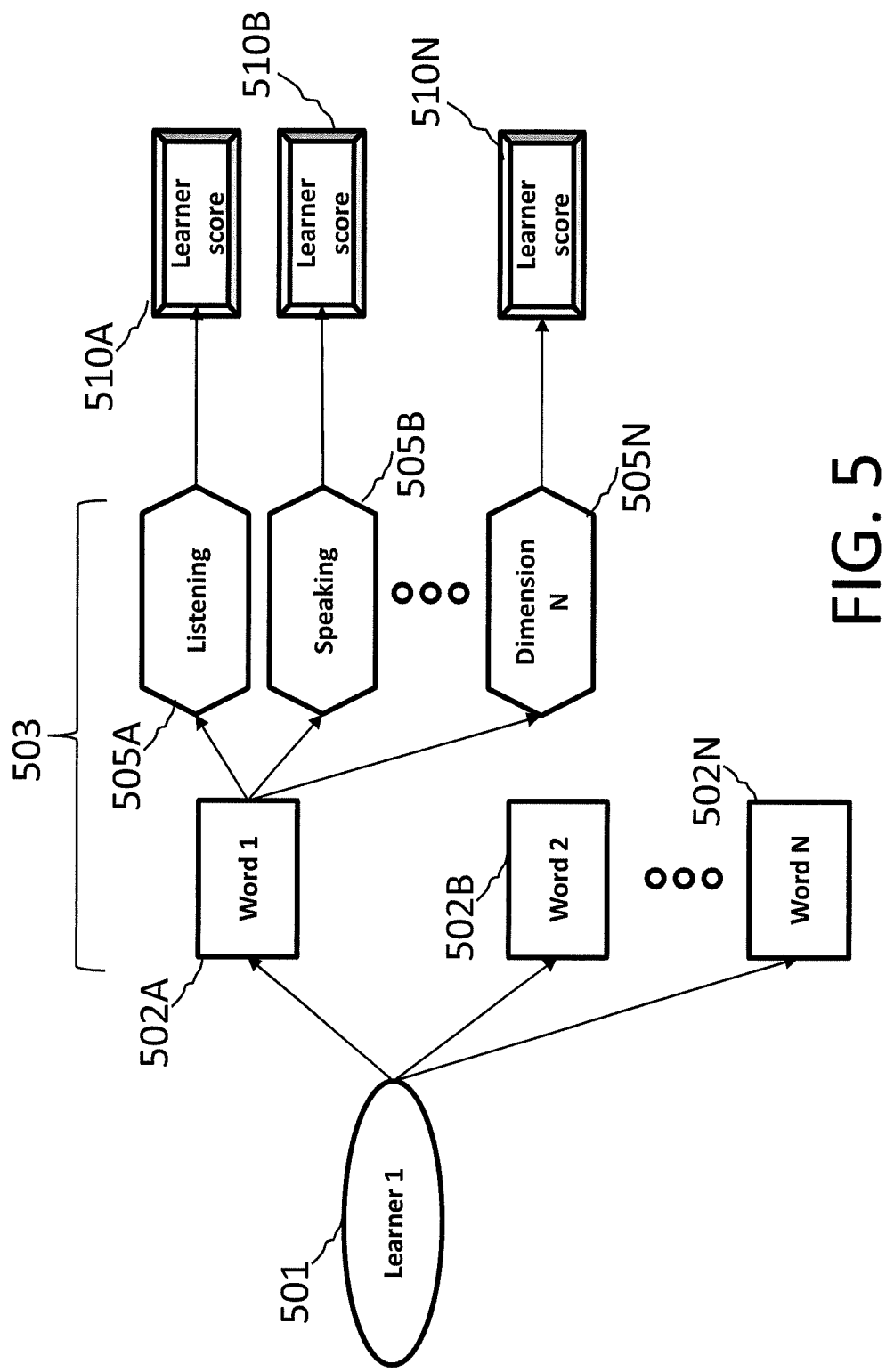
FIG. 5 depicts the multi-dimensional proficiency assessment processing module's use of testing and assessment 500 for generating a learner score while the learner is learning in accordance with one embodiment.

FIG. 5 depicts the multi-dimensional proficiency assessment processing module's use of testing and assessment 500 for generating a learner score while the learner is learning. The learner score is a continuous variable between 0 and 1 that keeps getting updated to show the proficiency of the learner in a continuous space. As shown in FIG. 5, associated with a learner 501 is a selection of words 502A, 502B, . . . , 502N. Each learner 501 has different words in their learner model. Further, each word has one or more dimensions of learning. For example, the learner's proficiency of a word 502A may require assessment along to dimensions such as listening 505A, speaking 505B or any other associated dimension 505N, e.g., writing. Each word-dimension combination 503 has a Learning Score "LS" computed. For example, vocabulary word learning assessment dimensions such as listening 505A, speaking 505B or dimension 505N will generate corresponding learning scores 510A, 51B and 510N respectively. These same dimensions exist in the learner model.

For each word, the system maintains the learning score (LS). In one embodiment, the LS is computed according to an ARMA (Auto-regressive Moving Average) model of the correct and incorrect attempts at various activities that test the learner's receptive as well as productive knowledge of the words.

FIG. 6 depicts a phased word expansion method 600 for vocabulary learning. Phased learning platform module 325 of system 300 may be invoked to initiate method steps of FIG. 6. A first step 605 depicts a step of evaluating a new learner by serving that new learner assessment content. That is, when a new student enters the system, the system initially does not know their knowledge level. Thus, a tutor may serve the new student assessment content in order to understand what they know, and accordingly, at 610, determine a working set of words (i.e., the learning content). Then, at 615, FIG. 6 the system obtains from a memory storage device the working set of new words to administer to the new student. At 620, the system may automatically select a new word from the working set of words for the student to learn. At 625, the system further initializes that new student's learner model which may include the ARMA model. Then, at 630, the system enters the learning phase and a tutor may initiate the system to present learning content for the student to learn the selected word(s) from the working set of words. As mentioned, this content may include, but is not limited to: multiple learning and assessment activities such as in-classroom applications ("apps"), direct consumer apps, video, conversations and other presentation mechanisms to teach the word. Further, there may be administered smart toys/games, e.g., in partnership with toy manufacturers, and even I-o-T extensions that provide for the learner a physical-digital learning experience. As a result of the student attempting such learning activities in this learning phase, the tutor may assess a learning score ("LS") for that student that is used to update the ARMA (learner) model such as depicted at 635, FIG. 6. It should be understood that a digital application presented to the user during the learning phase may further generate a learner score that can be used to update the ARMA model at 635.

In one embodiment, every time a learner takes an assessment for a learning objective (e.g., vocabulary word), the system recalculates the new learner score wherein the calculation of new learner score uses old learner score and the score of the assessment that was just conducted. Using the ARMA model, the LS is computed as:

$$LS_{t+1} = \alpha LS_t + (1-\alpha) AS_t$$

where $As_t$ is the score for the most recent assessment and the coefficient $\alpha < 1$. This results in an equation for the $(k+1)^{th}$ attempt, $LS_{k+1} = (1-\alpha)(AS_k + \alpha AS_{k-1} + \alpha^2 AS_{k-2} + \alpha^3 AS_{k-3} \ldots + \alpha^{k-1} AS_t)$, i.e., the equation puts more weight on the more recent attempt results than the older attempt results since $\alpha < 1$ and results in a slow growth of the learner score.

In one embodiment, the value of α (alpha) is small enough that it does not cause impact on learner score, but not too small to exhaust the learner with too many assessment (avoid learner apathy). On example value is α=0.2 but may differ based on implementation.

In one embodiment, given the distributed nature of the learner model update such that any of the applications that are reporting assessment results, one or more applications may turn "malicious" or maybe be too "easy". That is, over time, each administered application may develop some sort of a "reputation". The present method addresses the translation of that reputation into a further weight that can be used to increase, decrease or keep the same the impact of an assessment being submitted from a given application.

Continuing at 640, FIG. 6, there is depicted the step of determining whether the student's learner score has exceeded the first transition between the learning phase and the assessment-only phase. If the LS score has exceeded the transition threshold for that word, then this indicates the student has a good mastery over the word, indicated by the LS, and can be served only assessments. Thus, at 640, the system transitions to the next phase 645, i.e., the assessment-only phase, to determine the child's receptive as well as productive knowledge of the word. In one embodiment, the threshold is a value that is either set by a person or computed outside of the system. One example threshold value is 0.86 and may be set to indicate a particular learning objective phase.

In one embodiment, a threshold of transition (T) is the point when learner transitions from one state to another, such as from Learning to Assessment for a vocabulary word. Thus, at 640, a determination is made as to whether:

$$AS < T_{AS} \text{ OR } LS > T_{LS}$$

where $T_{AS}$ and $T_{LS}$ are threshold for the recent attempt score and child's learning score respectively. If these criteria are met, then the student would be served an assessment content. Alternatively, a determination is made as to whether:

$$AS > T_{AS} \text{ AND } LS < T_{LS}$$

and if these criteria are met, then the student should be served a further learning content.

Generally, if a student who has good mastery over the word, indicated by the LS, can be served assessments; and if a student has not been able to attain a desirable LS even after a large number of attempts need a learning content.

Thus, at 640, FIG. 6, if the transition threshold is not exceeded, then the system may direct that the student to return to the first learning phase at 630, FIG. 6 so the student may continue to perform more learning activities associated with that word.

Continuing at 645, FIG. 6, there is depicted the step of performing the assessment-only phase where gamification techniques may be introduced to perform child assessments associated with a particular learning objective or dimension, e.g., reading, writing, speaking, etc. for that word. For each attempted assessment, in each dimension (learning objective), there is a corresponding score generated, i.e., a score for the current assessment which score may be received from a tutor or received from a particular assessment tool (e.g., digital game) that measures the learner's receptive or productive proficiency for that word.

As a result of the assessing the student's word use proficiency (productive and receptive) in this assessment-only phase, the game tool or the tutor may input the current assessed score to the ARMA (learner) model to update that user's learning model for that student such as depicted at 650, FIG. 6.

Continuing, at 655, a determination is made as to whether a second transition threshold has been exceeded which would indicate the learner's mastery of the word and enter the learned words phase. If the second transition threshold has not been exceeded, the system may return to the first learning phase at 630, FIG. 6 so the student may continue to perform more learning activities associated with that word and increase his/her proficiency. Otherwise, if the second transition threshold has been exceeded, then the system will proceed to determine at 660 whether there are any more dimensions in which to assess that learner's proficiency.

That is, a vocabulary word of the working set can be in a different phase for a different dimension of proficiency, e.g., a child might know the word very well from a receptive proficiency perspective (i.e. understands when exposed to the word), but may not be able to use the word himself in practice, or the user may have mastered the listening and reading learning objectives, yet lag in writing and speaking objectives. Thus, if there are additional proficiency dimensions in which learner is to be assessed, then the process return to step 645 to perform the further assessments for that word for that particular dimension. Otherwise, at 660, if the learner has achieved proficiency of the word for all dimensions, then the process proceeds to 665, FIG. 6 where a determination is made as to whether there are any more words in the working set in which to learn. If at 665 it is determined that there are additional words in the current working set in which to learn, then the system returns to step 620 to get the new word from the set and the system repeats the method. If, at 665, it is determined that there are no new words in the working set, then the system may return to step 615, FIG. 6 such that the next working set of new words may be obtained and the steps 620-665 are repeated for the new working set.

FIG. 7 depicts a method to address the phenomena of a learner's memory decay. As mentioned, to prevent the possibility that the learner forgets or loses the proficiency or use of a word in any dimension, the system may return the learner to the assessment phase 410 in order to reinforce the words already learned. The phased learning platform module 325 of system 300 may be invoked to initiate method 700 of FIG. 7 which includes a first step 702 of obtaining an already learned word for that child, and at 705 computing a time elapsed since that child's last proficiency assessment for that word. In one embodiment, temporal decay is addressed whereby words could be transitioned back after a configurable period of time for getting explicitly assessed. The period of time can be automatically learned by the system based on the general model of the child built over a period of time. At 710, a determination is made as to whether the time elapsed since the last assessment has exceeded a learned or pre-determined time threshold. As a non-limiting example, logic implemented at step 710 to detect temporal decay may be depicted in the following pseudo-code as:

For each word,
      if (current time−last assessed time>threshold) then
      {Transition the word back to assessment}

If the time elapsed for that learned word has exceeded the threshold, then the process returns to step 645, FIG. 6 in order to perform a further assessment.

It should be further understood that the memory decay does not always have to be time based. That is, at some point after the user has entered "learned word" phase, a word may be brought back for further assessment to check if that user's mastery still holds. A word can move from the "learned phase" back into other phases based on assessing the learner.

FIG. 8 further depicts a method to address the phenomena of a learner's interference decay whereby related words that are often mutually confusing could be transitioned back into the assessment phase to ensure that any misconceptions did not arise due to new words being learned by a child. In one embodiment, the related words may be transitioned back as clusters into the assessment phase. To prevent the possibility of interference decay of a word in any dimension, the system may return the learner to the assessment phase 645 in order to reinforce the words already learned. The phased learning platform module 325 of system 300 may be invoked to initiate method 800 of FIG. 8 which includes a first step 802 of obtaining an already learned word for that child, and at 805 determining attributes of the just learned words. Such attributes may be a particular characteristic, feature or element of the learned words. In an embodiment, attributes may include, but are not limited to: semantically related words and words used together contextually At 810, based on the attributes of the just learned words, there is determined whether the words/attributes of the learned words engender any confusion with new vocabulary words of a working set currently being learned by the child. At 820, FIG. 8, a determination is made as to whether any words/ attributes create an excessive confusion or renders the child overly confused. In one embodiment, excessive confusion may be determined based on phonetic proximity of the words, e.g., "earn" and "yearn" or "earn" and "urn", etc. In a non limiting example, an assessment may relate to a learning objective that is often confused with a target learning objective. For example, given multiple choice questions where the learner is asked which number is "6" and which is "9", a learner can often mistake the two numbers visually. In this case if the target learning objective is "6", then "9" is a distractor. Thus, if a learner selects the misconception answer repeatedly, this would inform that the user may be confused. As another example, if the user keeps providing the wrong answer for the same questions, this is indication of a confusion that may warrant re-introducing the word back to the learning or assessment-only phase.

If the child is not overly confused, then the process ends. Otherwise, if the child exhibits abnormal amount of confusion, then the process proceeds to 825 to determine if the learned word is related to the new words of the working set. If the word is not related to any current word of the working set, the word may be re-introduced into the assessment-only phase by returning to step 645, FIG. 6 to reinforce the child's proficiency of the word in one or more dimensions. Otherwise, if the learned word is related to a new vocabulary word in a working set the word may be clustered at 830 with other related words, and all words of that cluster re-introduced into the assessment-only phase by returning to step 645, FIG. 6 to reinforce the child's proficiency of the learned words (or learning objective) in one or more dimensions.

As a further example, a child may first learn "insect" through examples, and when the concept of "arachnid" is introduced may cause confusion. In such a case, the word insect could be brought back for assessment to clarify for the child the concept of both insects and arachnids. As a non-limiting example, logic implemented at step 820 to detect interference decay may be depicted in the following pseudo-code as:

For each word,
      if (Just-learned-word shares attributes, and is often-confused-with previously learned word)
        {Transition previously learned word back to assessment}

In one embodiment, the student may be assessed on the word "insect" without moving the word back to the assessment phase.

The phased vocabulary word learning system and methods described herein are adapted to exactly define the phases on a domain-specific basis, and provides for a specific effective way of defining phases for vocabulary learning to make vocabulary learning more structured. The movement of phases is usually driven by a change in the learning score of that word. The transferability of learner model based on inter-application normalization is advantageous since most applications have a cold start problem to level-set the users for any learning activity.

Figure 9:
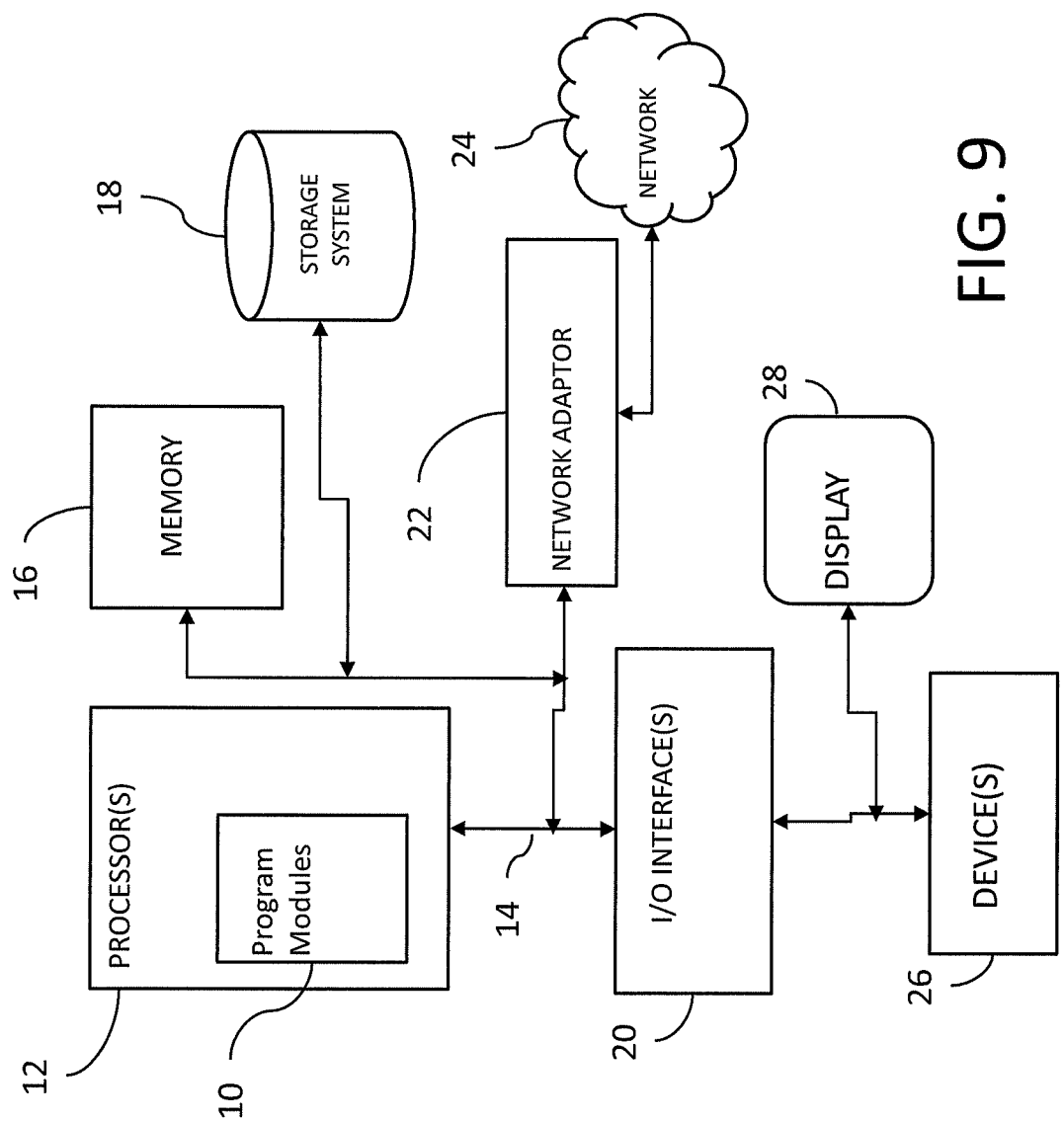
FIG. 9 depicts a schematic of an example computing system configurable for running the system and method embodiments of the present disclosure.

FIG. 9 illustrates an example computing system in accordance with the present invention that may provide the services and functions associated with phased word expansion for vocabulary learning. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 6-8.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for phased learning comprising:

administering, via an electronic user interface device, a multi-media stimuli to a user for the user to respond to, the stimuli comprising one or more learning and assessment activities associated with a learning objective across multiple learning dimensions, the learning objective comprising learning a vocabulary word;

receiving, via the electronic user interface device, responses to the stimuli from the user, said responses for use in assessing a learning of the vocabulary word;

administering, via the electronic user interface device, a digital game to the user for assessing, by the one or more hardware processors, the user's receptive proficiency and productive proficiency of said vocabulary word at each said dimension of said multiple learning dimensions and generating an associated assessment proficiency score for each said dimension; and for said vocabulary word learning objective:

determining, by running a learner model update procedure on a hardware processor of a computing device, a learner score associated with the vocabulary word learning objective based on said generated assessment score corresponding to each of said one or more learning activities associated with the vocabulary word learning objective;

comparing, using said hardware processor, said learner score against one or more threshold values; and repeating said administering of stimuli and said receiving responses to said stimuli via said electronic user interface device, said assessing, said determining and said comparing, until the user's learner score for said vocabulary word learning objective exceeds a threshold value demonstrating said user having sufficient receptive proficiency and productive proficiency for said vocabulary word learning objective, said determining comprising a recalculating of said learner score as a function of a previous prior learning score and prior generated assessment proficiency scores obtained for each administered learning activity associated with a respective learning dimension; and upon achieving said proficiency of the vocabulary word for all said multiple dimensions, enter a new learning phase by introducing to said user via said electronic user interface device a new words set, and said new words of said new words set selected based on: a proximity or relatedness to a previously learned word by traversing a graph data structure representing a knowledge-base of words or concepts, the knowledge-base graph data structure including nodes representing the words and interconnecting links representing inter-word relationships, and repeating said administering of stimuli and said receiving responses to said stimuli via said electronic user interface device, said assessing, said determining and said comparing for a new related vocabulary word learning objective.

2. The method of claim 1, further comprising:
administering, via a computing device, a learning activity to said user and generating a respective assessment score corresponding to each of a respective reading, listening, writing, and speaking learning dimension for said vocabulary word learning objective.

3. The method of claim 1, further comprising:
administering, using said processor, learning and assessment activities to said user until said learner score exceeds a first threshold value, and thereafter administering only proficiency assessments to determine a user's proficiency of said learning objective until said learner score exceeds a second threshold value at which time said user has achieved said learning objective with said sufficient proficiency.

4. The method of claim 1, wherein said learner model is an auto-regressive moving average (ARMA) model, said method comprising:
receiving at said processor, an assessment score based on a current learning activity or assessment activity and a current learner score; and
updating said ARMA model based on said received assessment and current learner scores.

5. The method of claim 1, further comprising:
determining whether the user exhibits decreased proficiency of said learning objective in one or more of said multiple learning dimensions; and
re-introducing, using the processor, the learning objective back for user proficiency assessment.

6. The method of claim 5, further comprising:
determining, by the processor, a time elapsed since having achieved sufficient proficiency of said learning objective; and
re-introducing the learning objective back for user proficiency assessment after the elapsed time exceeds a threshold.

7. The method of claim 1, further comprising:
determining, by the processor, attributes of a previously learned vocabulary word;
determining by a processor, whether a previously learned vocabulary word include attributes relating to a new vocabulary word being learned;
re-introducing the learned vocabulary word back for user proficiency assessment if said previously learned vocabulary word results in a user confusion with said new vocabulary word being learned.

8. The method of claim 1, wherein said selecting said words of said new words set for the new learning phase based on a proximity between a word and another new word is based on one of: a word embedding function that implements quantifying and categorizing contextual similarities between linguistic items based on distributional properties in large samples of language data, or a connectedness of word represented as a node to another new word node via one or more edges that represent a relationship between the words, wherein a number of hops from one word to another represents a strength of the similarity or relatedness between two given words.

9. A computer-implemented system for phased learning comprising:
a memory storage system storing program instructions;
a hardware processor for running said stored program instructions to configure the processor of a computing device to:
administer, via an electronic user interface device, a multi-media stimuli to a user for the user to respond to, the stimuli comprising one or more learning and assessment activities associated with a learning objective across multiple learning dimensions, the learning objective comprising learning a vocabulary word;
receive, via the electronic user interface device, responses to the stimuli from the user, said responses for use in assessing a learning of the vocabulary word;
administer, via the electronic user interface device, a digital game to the user to assess the user's receptive proficiency and productive proficiency of said vocabulary word at each said dimension of said multiple learning dimensions and generating an associated assessment proficiency score for each said dimension; and
for said vocabulary word learning objective:
determine, by running a learner model update procedure on the hardware processor, a learner score associated with the vocabulary word learning objective based on said generated assessment score corresponding to each of said one or more learning activities associated with the vocabulary word learning objective;
compare said learner score against one or more threshold values; and
repeat said administering of stimuli and said receiving responses to said stimuli via said electronic user interface device, said assessing, said determining and said comparing until the user's learner score for said vocabulary word learning objective exceeds a threshold value demonstrating said user having sufficient receptive proficiency and productive proficiency for said vocabulary word learning objective, said determining comprising a recalculating of said learner score as a function of a previous prior learning score and prior generated assessment proficiency scores obtained for each administered learning activity associated with a respective learning dimension; and
upon achieving said proficiency of the vocabulary word for all said multiple dimensions, enter a new learning phase by introducing to said user via said electronic user interface device a new words set, and said new words of said new words set selected based on: a proximity or relatedness to a previously learned word by traversing a graph data structure representing a knowledge-base of words or concepts, the knowledge-base graph data structure including nodes representing the words and interconnecting links representing inter-word relationships, and repeat said administering of stimuli and said receiving responses to said stimuli via said electronic user interface device, said assessing, said determining and said comparing for a new related vocabulary word learning objective.

10. The system of claim 9, wherein said processor is further configured to:
administer learning activities to said user and generating a respective assessment score corresponding to each of a respective reading, listening, writing, and speaking learning dimension for said vocabulary word learning objective.

11. The system of claim 9, wherein said processor is further configured to:
administer, via a computer device, said learning and assessment activities to said user until said learner score exceeds a first threshold value, and thereafter administer only proficiency assessments to determine a user's proficiency of said learning objective until said learner score exceeds a second threshold value at which time said user has achieved said learning objective with said sufficient proficiency.

12. The system of claim 9, wherein said learner model is an auto-regressive moving average (ARMA) model, said processor being further configured to:
receive an assessment score based on a current learning activity or assessment activity and a current learner score; and
update said ARMA model based on said received assessment and current learner scores.

13. The system of claim 9, wherein said processor is further configured to:
determining whether the user exhibits decreased proficiency of said learning objective in one or more said learning dimensions; and
re-introducing, using the processor, the learning objective back for user proficiency assessment.

14. The system of claim 9, wherein said learning objective is learning a vocabulary word, said processor is further configured to:
determine attributes of a previously learned vocabulary word;
determine whether a previously learned vocabulary word include attributes relating to a new vocabulary word being learned; and
re-introduce the learned vocabulary word back for user proficiency assessment if said previously learned vocabulary word results in a user confusion with said new vocabulary word being learned.

15. The system of claim 9, wherein to select said words of said new words set for the new learning phase based on a proximity between a word and another new word, said processor is further configured to perform one of:
use a word embedding function that implements quantifying and categorizing contextual similarities between linguistic items based on distributional properties in large samples of language data, or
implement a connectedness of word represented as a node to another new word node via one or more edges that represent a relationship between the words, wherein a number of hops from one word to another represents a strength of the similarity or relatedness between two given words.

16. A computer readable medium comprising instructions that, when executed by at least one processor comprising hardware, configure the at least one hardware processor to:
administer, via an electronic user interface device, a multi-media stimuli to a user for the user to respond to, the stimuli comprising one or more learning and assessment activities associated with learning objective across multiple learning dimensions, the learning objective comprising learning a vocabulary word;
receive, via the electronic user interface device, responses to the stimuli from the user, said responses for use in assessing a learning of the vocabulary word;
administer, via the electronic user interface device, a digital game to the user to assess the user's receptive proficiency and productive proficiency of said vocabulary word at each said dimension of said multiple learning dimensions and generating an associated assessment proficiency score for each said dimension; and
for said vocabulary word learning objective:
determine, by running a learner update procedure on the hardware processor, a learner score associated with the vocabulary word learning objective based on said generated assessment score corresponding to each of said one or more learning activities associated with the learning objective;
compare said learner score against one or more threshold values; and
repeat said administering of stimuli and said receiving responses to said stimuli via said electronic user interface device, said assessing, said determining and said comparing until the user's learner score for said vocabulary word learning objective exceeds a threshold value demonstrating said user having sufficient receptive proficiency and productive proficiency for said vocabulary word learning objective, said determining comprising a recalculating of said learner score as a function of a previous prior learning score and prior generated assessment proficiency scores obtained for each administered learning activity associated with a respective learning dimension; and
upon achieving said proficiency of the vocabulary word for all said multiple dimensions, enter a new learning phase by introducing to said user via said electronic user interface device a new words set, and said new words of said new words set selected based on: a proximity or relatedness to a previously learned word by traversing a graph data structure representing a knowledge-base of words or concepts, the knowledge-base graph data structure including nodes representing the words and interconnecting links representing inter-word relationships, and repeating said administering of stimuli and said receiving responses to said stimuli via said electronic user interface device, said assessing, said determining and said comparing for a new related vocabulary word learning objective.

17. The computer readable medium of claim 16, wherein the instructions further configure the at least one processor to:
administer said learning and assessment activities to said user until said learner score exceeds a first threshold value, and thereafter administer only proficiency assessments to determine a user's proficiency of said learning objective until said learner score exceeds a second threshold value at which time said user has achieved said learning objective with said sufficient proficiency.

18. The computer readable medium of claim 16, wherein said learner model is an auto-regressive moving average (ARMA) model, said instructions further configuring the at least one processor to:
- receive an assessment score based on a current learning activity or assessment activity and a current learner score; and
- update said ARMA model based on said received assessment and current learner scores.

19. The computer readable medium of claim 16, wherein to select said words of said new words set for the new learning phase based on a proximity between a word and another new word, the instructions further configure the at least one processor to perform one of:
- use a word embedding function that implements quantifying and categorizing contextual similarities between linguistic items based on distributional properties in large samples of language data, or
- implement a connectedness of word represented as a node to another new word node via one or more edges that represent a relationship between the words, wherein a number of hops from one word to another represents a strength of the similarity or relatedness between two given words.

\* \* \* \* \*